United States Patent [19]

Frame

[11] 4,027,891
[45] June 7, 1977

[54] BICYCLE TYPE SKI APPARATUS

[75] Inventor: Bruce H. Frame, Wytheville, Va.

[73] Assignee: The Raymond Lee Organization, Inc., a part interest

[22] Filed: Apr. 9, 1976

[21] Appl. No.: 675,487

[52] U.S. Cl. .............................. 280/7.14; 280/16
[51] Int. Cl.² ........................................ B62B 13/04
[58] Field of Search ................. 280/7.14, 7.12, 16, 280/15

[56] References Cited

UNITED STATES PATENTS

| 567,526 | 9/1896 | Ward | 280/7.14 |
| 1,291,115 | 1/1919 | Pilushczak | 280/7.14 |
| 1,337,396 | 4/1920 | Eiselt | 280/7.14 |

*Primary Examiner*—Robert R. Song

[57] ABSTRACT

A bicycle type ski apparatus for use on snow which employs a bicycle type frame with front and rear wheels removed whereby the frame has bottom front and bottom rear end points. Each of first and second elongated downwardly inclined hollow sheaths has an enlarged opening at an upper end in which a corresponding one of said end points is detachably disposed. First and second horizontal skis are used. Each of first and second brackets is secured to the top surface of the corresponding ski and includes a horizontal rod extending longitudinally along the corresponding ski and spaced thereabove. Each of first and second parallel horizontal axles extending at right angles to the rods is secured to and extends through the lower end of the corresponding sheath. Each of first and second connectors is pivotally secured to the corresponding one of the axles and is rotatably disposed about the corresponding one of the rods. Each of first and second rotation limiting means is secured to a corresponding one of the connectors and extends downwardly towards the top surface of the corresponding one of the skis to limit the rotation of the corresponding connector in either direction about the corresponding rod to a selected arc.

4 Claims, 4 Drawing Figures

BICYCLE TYPE SKI APPARATUS

BACKGROUND OF THE INVENTION

It is known to remove the front and rear wheels of a bicycle and replace same with skis whereby the resultant device can be used to travel on snow. It is also known that each ski can be pivotally secured to the bicycle frame whereby the ski can pivot in a vertical plane extending along the longitudinal direction of the frame.

However, such devices still exhibit poor stability when subjected to a tipping force. The invention discribed herein has much increased stability to such force.

SUMMARY OF THE INVENTION

In accordance with the invention, the front and rear wheels of a bicycle are removed leaving a frame with bottom front and bottom rear end points. Each end point is secured to a corresponding ski in such manner that each ski can not only pivot in a first vertical plane extending along the longitudinal direction but can also pivot in a second vertical plane disposed at right angles to the longitudinal direction whereby the stability is enhanced. Moreover, means are provided for limiting the maximum arc through which each ski can pivot in either direction in the second plane whereby the resistance to tipping increases.

DETAILED DESCRIPTION OF PREFERRED EMBODIMENT

Figure 1:
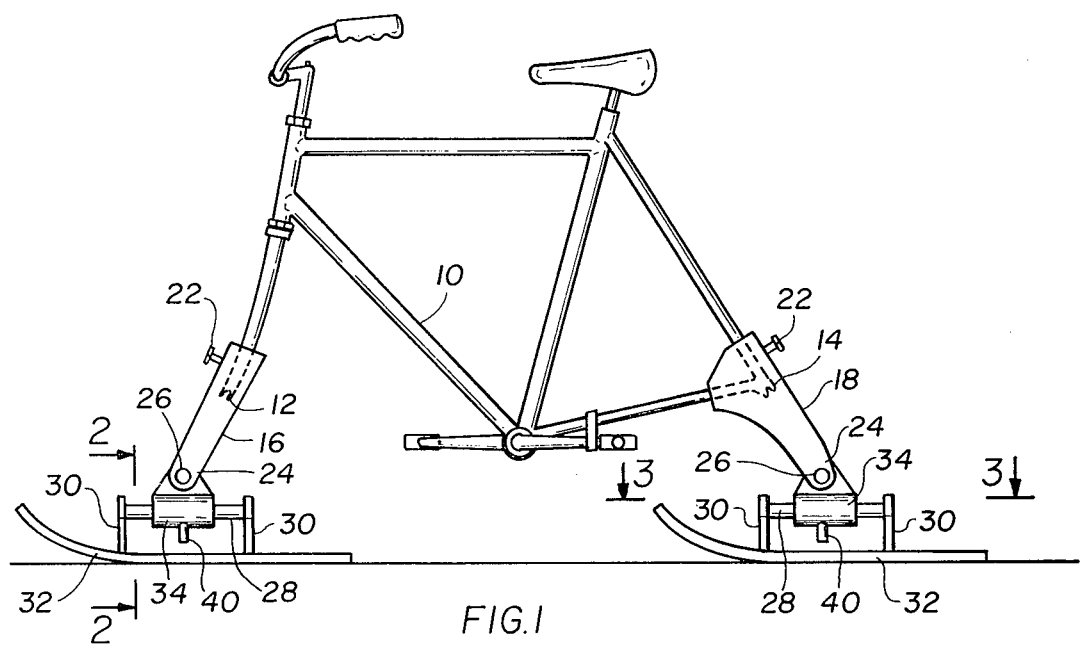
FIG. 1 is a side view of the invention.
Figure 2:
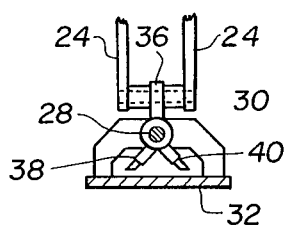
FIG. 2 is a view taken along line 2—2 in FIG. 1.
Figure 3:
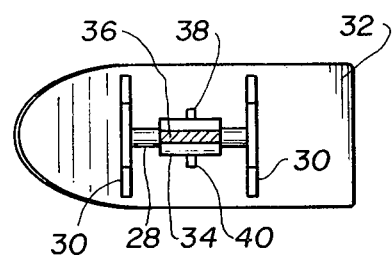
FIG. 3 is a view taken along line 3—3 in FIG. 1.
Figure 4:
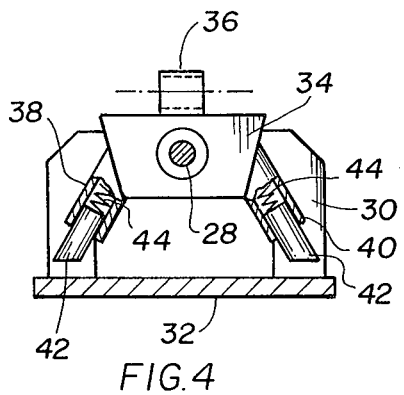
FIG. 4 is an enlarged detail view of a portion of the structure shown in FIG. 2.

Referring now to FIGS. 1–4, a bicycle frame 10 has front and rear wheels removed, thereby exposing a bottom front end point 12 and a bottom rear end point 14.

There are two hollow elongated sheaths 16 and 18. End point 12 fits removably into the top open enlarged end of sheath 16. End point 14 fits removably into the top open enlarged end of sheath 18. Thumbscrew means 22 holds each sheath in position. The lower end of each sheath forms a fork 24 and a corresponding one of two horizontal axles 26 extends therebetween and is supported therein. These axles are disposed at right angles to the directon of elongation.

There are two brackets, each being constituted by a horizontal rod 28 with downwardly disposed U-shaped supports 30 at each side. These brackets are each secured to the top surface of a corresponding one of front and rear skis 32 whereby each rod is disposed above the corresponding ski and extends in the longitudinal direction at right angles to the axles.

Each of first and second hollow horizontally elongated sleeves 34 is rotatably disposed about a corresponding rod 28, each rod passing through an axial bore in the sleeve. Each sleeve has a vertical flange 36 pivotally secured to a corresponding axle, disposed at right angles thereto and disposed between the elements of the corresponding fork.

Each sleeve has two hollow legs 38 and 40 which lie in a common vertical plane disposed at right angles to the rods and which extend downwardly and outwardly with respect to each other. A separate stub 42 is slidably disposed in each leg and is spring loaded as shown at 44.

Thus by means of the flanges 36 each ski can pivot about its axle in a first vertical plane which extends in the direction of elongation of the frame and by means of sleeves 34 can pivot about its rod in a second vertical plane which extends at right angles to the first plane. The stubs limit the maximum arc of pivot obtainable in either direction in the second plane and thus resist tipping.

While the invention has been described with particular reference to the drawings, the protection sought is to be limited only by the terms of the claims which follow.

What is claimed is:
1. A device comprising:
a bicycle frame having front and rear wheels removed whereby the frame has bottom front and bottom rear end points;
first and second elongated downwardly inclined hollow sheaths, each sheath having an enlarged opening at an upper end, each of the end points being disposed removably in the upper end of the corresponding one of the sheaths;
first and second horizontal skis;
first and second brackets, each bracket being secured to the corresponding ski and including a horizontal rod extending longitudinally along the corresponding ski and spaced above its top surface;
first and second parallel horizontal axles extending at right angles to said rods, each axle being secured to and extending through the lower end of the corresponding sheath;
first and second connectors, each connector being pivotally secured to the corresponding one of the axles and rotatably disposed about the corresponding one of said rods; and
first and second rotation limiting means, each means being secured to the corresponding one of the connectors and extending downwardly towards the top surface of the corresponding one of the skis to limit the rotation of the corresponding connector in either direction about the corresponding rod to a selected arc.

2. The device of claim 1 wherein the first sheath extends forward and downward and the second sheath extends rearward and downward.

3. The device of claim 2 wherein each means includes two spaced spring loaded stubs which extend downwardly and away from each other, said stubs lying in a vertical plane disposed at right angles to the corresponding rod.

4. The device of claim 3 wherein said frame carries pedals and cranks and means to lock said pedals and cranks in desired position.

* * * * *